(12) United States Patent
Matsuoka

(10) Patent No.: US 6,335,680 B1
(45) Date of Patent: Jan. 1, 2002

(54) VEHICLE SURROUNDINGS MONITORING DEVICE

(75) Inventor: Katsuji Matsuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/795,079

(22) Filed: Mar. 1, 2001

(30) Foreign Application Priority Data

Sep. 28, 2000 (JP) ............................................ 12-296460

(51) Int. Cl.[7] ................................................ B60Q 1/00
(52) U.S. Cl. ........................ 340/435; 340/903; 340/904; 340/942; 340/936; 340/346; 455/575; 455/90; 455/300; 455/301; 455/73; 343/841; 361/816
(58) Field of Search ................................ 340/435, 903, 340/904, 942, 936, 346; 455/575, 90, 300, 301, 73; 343/841; 361/816

(56) References Cited

U.S. PATENT DOCUMENTS

| | | | |
|---|---|---|---|
| 5,338,617 A | * | 8/1994 | Workinger et al. .......... 428/551 |
| 5,339,075 A | * | 8/1994 | Abst et al. ................... 340/903 |
| 5,512,901 A | * | 4/1996 | Chen et al. .................. 342/175 |
| 5,878,353 A | * | 3/1999 | Ul Azam et al. ........... 455/550 |
| 5,898,908 A | * | 6/1999 | Yoshihara et al. ............ 455/73 |
| 6,243,024 B1 | * | 6/2001 | Yamabuchi et al. ......... 340/903 |

* cited by examiner

Primary Examiner—Daniel J. Wu
Assistant Examiner—Tai T. Nguyen
(74) Attorney, Agent, or Firm—Sughrue Mion, PLLC

(57) ABSTRACT

A vehicle surroundings monitoring device capable of performing distance measurement as desired even in a short-distance range to provide unerring alarm information to a driver. The monitoring device for monitoring surroundings around a vehicle has a transmitting antenna provided in a door mirror assembly of the vehicle to radiate transmitted waves through a mirror surface of the door mirror, and a receiving antenna provided in the door mirror assembly to receive reflected waves from an object existing near the vehicle through the door mirror surface. The monitoring device also has a stray electric wave limiting member for reducing electric wave components straying from the transmitting antenna into the receiving antenna. The stray electric wave limiting member is formed as an electric wave absorbing member provided between opening surfaces of the door mirror corresponding respectively to the transmitting and receiving antennas, a metal plate provided between the transmitting and receiving antennas, an electric wave absorbing member provided between the transmitting and receiving antennas and the door mirror except in front of the opening surfaces of the door mirror corresponding to the antennas, or a matching layer provided between the antennas and the door mirror.

6 Claims, 3 Drawing Sheets

VEHICLE SURROUNDINGS MONITORING DEVICE

BACKGROUND OF THE INVENTION

1. Field of the Invention

The present invention relates to a vehicle surroundings monitoring device mounted on a vehicle and used for monitoring of surroundings around the vehicle and, more particularly, to a vehicle surroundings monitoring device for alarming a driver to enable the driver to avoid contact with or collision against an obstacle particularly at the time of lane change or the like.

The entire content of the basic Japanese Patent Application from which the priority under the Convention is claimed in this application is hereby incorporated by reference into this application.

2. Description of the Related Art

The inventors of the present invention have already filed an application of a vehicle surroundings monitoring device of this kind in Japanese Patent Application No. Hei 11-325688. This vehicle surroundings monitoring device has a transmitting circuit for generating waves to be transmitted, an antenna mounted in the vicinity of or in a door mirror assembly of a vehicle and capable of radiating transmitted waves through a mirror surface of the door mirror, and a receiving circuit for receiving, by the antenna, reflected waves from an object existing near the vehicle, the reflected waves propagating to the antenna through the mirror surface of the door mirror. This vehicle surroundings monitoring device is characterized by having a reflective film which is formed on the mirror surface of the door mirror by vapor deposition, and which reflects light of wavelengths in the visible region but allows electric waves of several gigahertz to pass therethrough.

In such a vehicle surroundings monitoring device, however, even if a reflective film capable of transmitting of electric waves is vapor-deposited on the mirror surface of the door mirror as described above, the surface of the mirror base and the reflective film can partially reflect electric waves which should be passed through the mirror. This reflection causes straying of electric waves radiated from the transmitting antenna, such that some of the electric waves propagate to the receiving antenna without being reflected by any external obstacle. In such a situation, the monitoring device may operate as if an obstacle always exists at a short distance from the vehicle. When an object exists actually at a short distance from the vehicle, the monitoring device cannot detect the object if the distance resolution of the radar is not sufficiently high. Also, the distance measuring performance may be influenced by the above-described unwanted reflection to such an extent that the possibility of detection failure or a false alarm is high.

There is also a possibility of the mirror in the door mirror assembly being broken by contact with the antenna incorporated in the door mirror assembly.

SUMMARY OF THE INVENTION

In view of the above-described problem, an object of the present invention is to provide a vehicle surroundings monitoring device capable of performing distance measurement as desired even in a short-distance range to provide unerring alarm information to a driver.

Another object of the present invention is to provide a vehicle surroundings monitoring device capable of preventing a mirror in a door mirror assembly from being broken by contact with an antenna incorporated in the door mirror assembly.

To achieve the above-described objects, according to one aspect of the present invention, there is provided a vehicle surroundings monitoring device which monitors surroundings around a vehicle, the device is characterized by comprising a transmitting antenna mounted in a door mirror assembly of the vehicle, the transmitting antenna for radiating transmitted waves through a mirror surface of a door mirror in the door mirror assembly, a receiving antenna mounted in the door mirror assembly, the receiving antenna for receiving, through the mirror surface of the door mirror, reflected waves from an object existing in the surroundings of the vehicle, and a stray electric wave limiting member for reducing electric wave components straying from the transmitting antenna into the receiving antenna.

Specifically, the above-described stray electric wave limiting member is characterized by comprising an electric wave absorbing member provided between opening surfaces of the door mirror corresponding respectively to the transmitting antenna and the receiving antenna.

Also, the above-described stray electric wave limiting member is characterized by comprising a metal plate provided between the transmitting antenna and the receiving antenna.

Also, the above-described stray electric wave limiting member is characterized by comprising an electric wave absorbing member provided between the transmitting and receiving antennas and the door mirror except in front of the opening surfaces of the door mirror corresponding to the transmitting and receiving antennas.

Also, the above-described stray electric wave limiting member is characterized by comprising a matching layer provided between the transmitting and receiving antennas and the door mirror.

According to another aspect of the present invention, there is provided a vehicle surroundings monitoring device which monitors surroundings around a vehicle, the device is characterized by comprising a transmitting antenna mounted in a door mirror assembly of the vehicle, the transmitting antenna for radiating transmitted waves through a mirror surface of a door mirror in the door mirror assembly, a receiving antenna mounted in the door mirror assembly, the receiving antenna for receiving, through the mirror surface of the door mirror, reflected waves from an object existing near the vehicle, and a cushioning member provided between the transmitting and receiving antennas and the door mirror.

In a vehicle surroundings monitoring device according to the present invention, a stray electric wave limiting member for reducing electric wave components straying from transmitting antenna into the receiving antenna is provided to reduce electronic wave components straying from the transmitting antenna into the receiving antenna inside a door mirror, thereby ensuring a desired distance measuring performance in a short-distance range to provide unerring alarm information to a driver.

Also, a cushioning member is provided between the transmitting and receiving antennas and the door mirror to prevent a mirror in the door mirror from contacting and breaking the door mirror.

DESCRIPTION OF THE PREFERRED EMBODIMENTS

The present invention will be described with respect to embodiments in each of which a stray electric wave limiting member for reducing electric wave components straying from a transmitting antenna into a receiving antenna is provided, and an embodiment in which a cushioning member is provided between transmitting and receiving antennas and a door mirror.

Embodiment 1

A vehicle surroundings monitoring device which represents Embodiment 1 of the present invention will be described with reference to FIG. 1.

Figure 1:
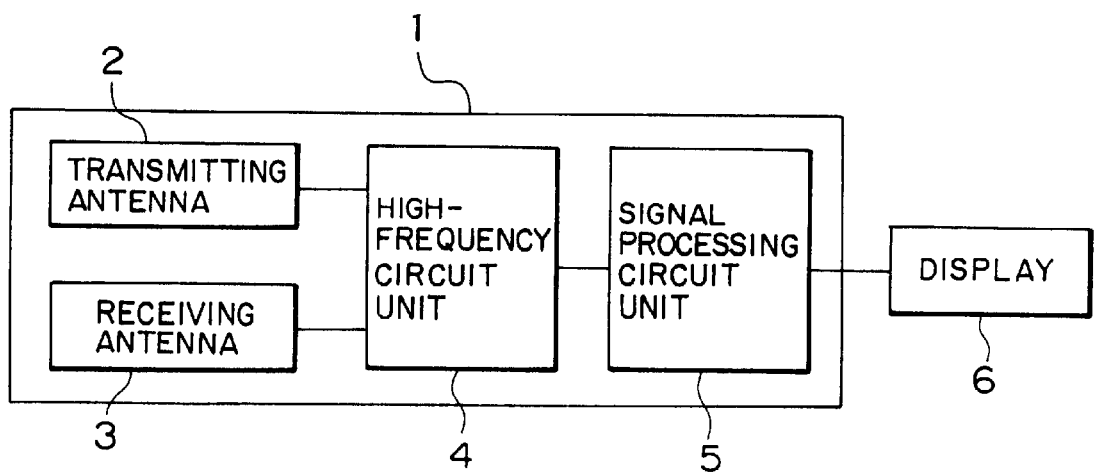
FIG. 1 is a block diagram showing the configuration of a vehicle surroundings monitoring device in Embodiment 1 of the present invention.

Referring to FIG. 1, a vehicle surrounding monitoring device mounted on a vehicle includes a radar 1 and a display 6. The radar 1 has a transmitting antenna 2 for radiating transmitted waves through a door mirror surface described below; a receiving antenna 3 for receiving, through the door mirror surface, reflected waves from an object existing near the vehicle; a high-frequency circuit unit 4 having a transmitting circuit for sending out transmitted waves and a receiving circuit supplied with received waves; and a signal processing circuit unit 5. Results of signal processing in the signal processing circuit 5 are displayed on the display 6 to provide information to a driver.

The radar 1 is mounted in a door mirror assembly of the vehicle, and the display 6 may be placed inside the vehicle or in the vicinity of the door mirror assembly.

Figure 2:
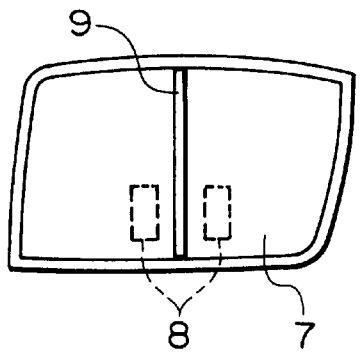
FIG. 2 is a diagram showing a door mirror surface in Embodiment 1 of the present invention.

Referring to FIG. 2, the structure seen from the door mirror surface side is illustrated. In FIG. 2, the door mirror surface is indicated by a reference numeral 7, opening surfaces for the transmitting antenna and the receiving antenna 3 are indicated by a reference numeral 8, and an electric wave absorbing member is indicated by a reference numeral 9. The electric wave absorbing member 9 is placed between the opening surfaces 8 corresponding respectively to the transmitting antenna 2 and the receiving antenna 3. Thus, a stray electric wave limiting member is formed to reduce electric wave components straying from the transmitting antenna into the receiving antenna in the door mirror assembly.

The operation of this embodiment will now be described.

Electric waves generated by the high-frequency circuit 4 are radiated out of the vehicle from the transmitting antenna 2 through the door mirror surface 7 and are reflected by an obstacle such as another vehicle existing near the vehicle having the monitoring device. The reflected waves enter the door mirror through the door mirror surface 7 to be received by the receiving antenna 3 and input to the high-frequency circuit unit 4. The received waves input to the high-frequency circuit unit 4 are down-converted into a low-frequency signal. This signal is input to the signal processing circuit 5, in which the distance to the obstacle, etc., are computed. If a risk of collision against the obstacle is thereby recognized, the driver is alerted to the risk by the display 6.

In this operation, as described above, electric wave components straying from the transmitting antenna 2 into the receiving antenna 3 can be reduced since the electric wave absorbing member 9 is placed between the opening surfaces 8 in the door mirror surface 7 corresponding respectively to the transmitting antenna 2 and the receiving antenna 3. Thus, the desired distance measuring performance in a short-distance range is ensured, so that unerring alarm information can be provided to the driver.

Embodiment 2

Embodiment 2 of the present invention also has the configuration shown in the block diagram of FIG. 1, as Embodiment 1 does. Only features of Embodiment 2 not described with respect to Embodiment 1 will be described below.

Figure 3:
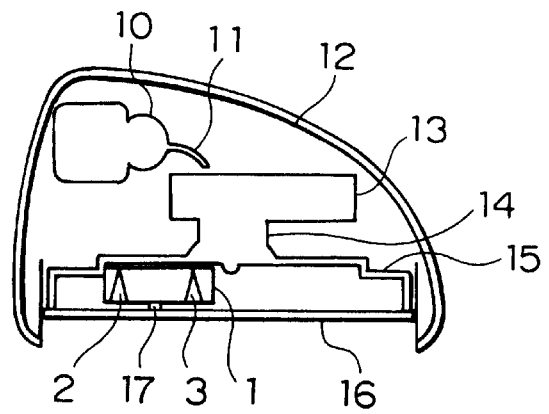
FIG. 3 is a diagram showing the internal structure of a door mirror assembly in Embodiment 2 of the present invention.

FIG. 3 is a diagram showing the internal structure of a door mirror assembly.

In FIG. 3, reference numerals respectively indicate a motor 10, a motor harness 11, a housing member 12, an actuator unit 13 for moving a door mirror, a connecting portion 14, a mirror holder 15, and a door mirror 16. A radar 1 is fixed in the mirror holder 15. A metal plate 17 is placed between a transmitting antenna 2 and a receiving antenna 3 as a stray electric wave limiting member for reducing electric wave components straying from the transmitting antenna 2 into the receiving antenna 3 inside the door mirror 16.

Thus, the metal plate 17 is placed between the transmitting antenna 2 and the receiving antenna 3 to reduce electric wave components straying from the transmitting antenna 2 into the receiving antenna 3, thereby ensuring a desired distance measuring performance in a short-distance range to provide unerring alarm information to a driver.

Embodiment 3

Embodiment 3 of the present invention also has the configuration shown in the block diagram of FIG. 1, as Embodiment 1 does. Only features of Embodiment 3 not described with respect to Embodiment 1 will be described below.

Figure 4:
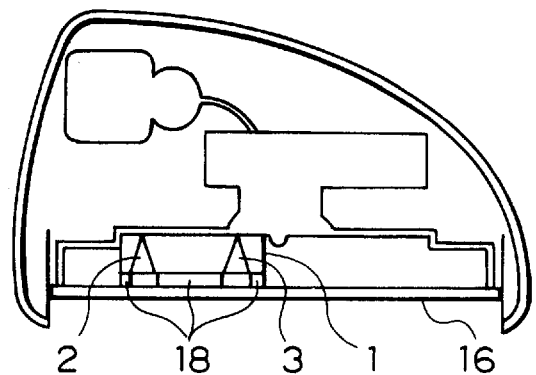
FIG. 4 is a diagram showing the internal structure of a door mirror assembly in Embodiment 3 of the present invention.

FIG. 4 is a diagram showing the internal structure of a door mirror assembly.

Referring to FIG. 4, an electric wave absorbing member 18 is placed between the radar 1 and the door mirror 16 as a stray electric wave limiting member for reducing electric wave components straying from the transmitting antenna 2 into the receiving antenna 3 inside the door mirror 16.

The electric wave absorbing member 18 is placed between the radar 1 and the door mirror 16 except in front of the opening surfaces for the transmitting antenna 2 and the receiving antenna 3 to reduce electric wave components straying from the transmitting antenna 2 into the receiving antenna 3, thereby ensuring the desired distance measuring performance in a short-distance range to provide unerring alarm information to a driver.

Embodiment 4

Embodiment 4 of the present invention also has the configuration shown in the block diagram of FIG. 1, as Embodiment 1 does. Only features of Embodiment 4 not described with respect to Embodiment 1 will be described below.

According to the principle of the ordinary antireflective film for lenses, an antireflective film structure may be formed in which the dielectric constant of the surface layer is the square root of the dielectric constant of the core, and in which the electrical thickness of the surface layer is an odd multiple of the ¼ wavelength. In this specification, such an antireflective film will be referred to as a matching layer. In a case where electric waves are incident upon a dielectric ($\epsilon_{r0}$: dielectric constant), a matching layer may be formed on the surface of the dielectric to limit reflection on the dielectric surface.

Figure 5:
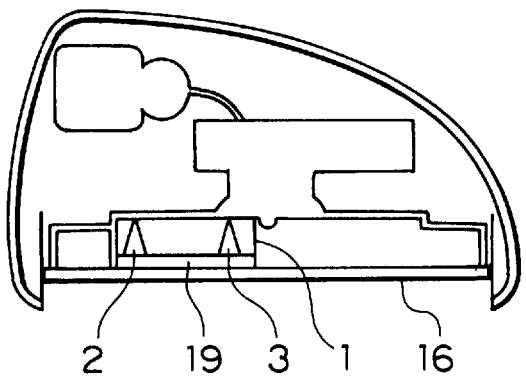
FIG. 5 is a diagram showing the internal structure of a door mirror assembly in Embodiment 4 of the present invention.

FIG. 5 is a diagram showing the internal structure of a door mirror assembly.

Referring to FIG. 5, a matching layer 19 is interposed between a radar 1 and a door mirror 16 as a stray electric wave limiting member for reducing electric wave components straying from a transmitting antenna 2 into a receiving antenna 3 inside the door mirror 16.

Figure 6:
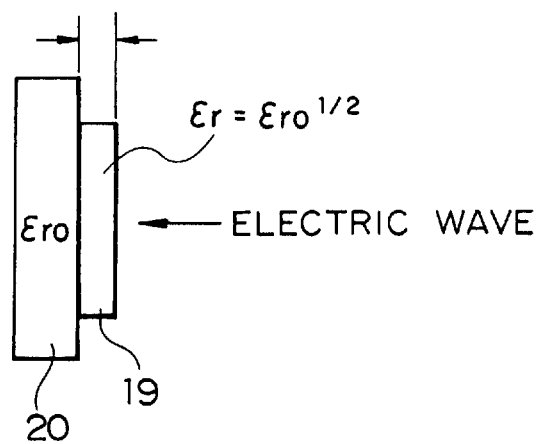
FIG. 6 is a cross-sectional view of a door mirror and a matching layer for explaining a feature of Embodiment 4 of the present invention.

FIG. 6 is a cross-sectional view of the door mirror and the matching layer.

In FIG. 6, the glass base of the mirror 16 is indicated by a reference numeral 20.

If the dielectric constant of the matching layer 19 is set to $\epsilon_r = \epsilon_{r0}^{1/2}$ and the thickness to $\lambda_0/(4 \times \epsilon_{r0}^{1/2})$ ($\lambda_0$: free-space wavelength), reflection on the glass base 20 surface can be suppressed ("Mitsubishi Denki Giho" p4, No. 7, Vol. 29, 1995).

In this manner, reflection on the mirror surface can be suppressed, that is, components of electric waves radiated from the transmitting antenna 2 and reflected by the mirror surface to propagate to the receiving antenna 3 are reduced, thereby ensuring the desired performance of distance measurement in a short-distance range to provide unerring alarm information to a driver.

Embodiment 5

Embodiment 5 of the present invention also has the configuration shown in the block diagram of FIG. 1, as Embodiment 1 does. Only features of Embodiment 4 not described with respect to Embodiment 1 will be described below.

Figure 7:
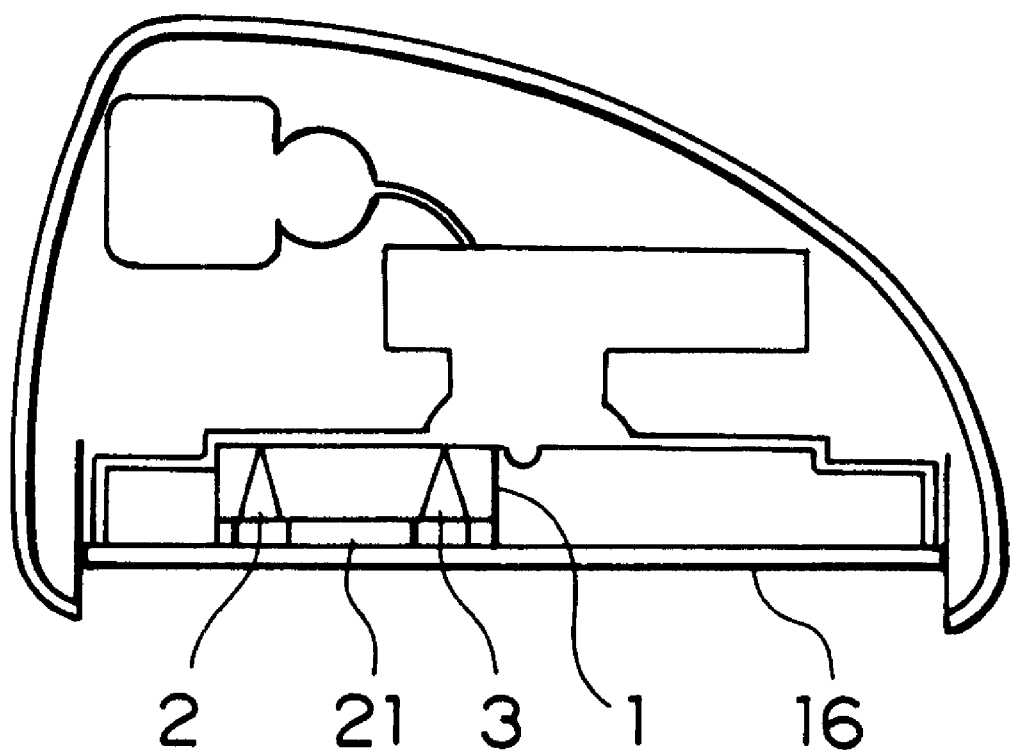
FIG. 7 is a diagram showing the internal structure of a door mirror assembly in Embodiment 5 of the present invention.

FIG. 7 is a diagram showing the internal structure of a door mirror assembly.

A cushioning member 21 is interposed between a radar 1 and a door mirror 16 to prevent antennas (2 and 3) provided inside the door mirror 16 from contacting and breaking the door mirror 16.

Thus, the radar 1 is prevented from hitting and breaking the door mirror 16 by vibration or the like.

According to the present invention, as described above, a stray electric wave limiting member for reducing electric wave components straying from a transmitting antenna into a receiving antenna is provided to reduce electric wave components straying from the transmitting antenna into the receiving antenna inside a door mirror, thereby ensuring a desired performance of distance measurement in a short-distance range to provide unerring alarm information to a driver.

The above-described stray electric wave limiting member may be formed as an electric wave absorbing member provided between the opening surfaces of the door mirror corresponding respectively to the transmitting antenna and the receiving antenna, a metal plate provided between the transmitting antenna and the receiving antenna, an electric wave absorbing member provided between the transmitting and receiving antennas and the door mirror except in front of the opening surfaces of the door mirror corresponding to the transmitting and receiving antennas, or a matching layer provided between the transmitting and receiving antennas and the door mirror. Electric wave components straying from the transmitting antenna and the receiving antenna inside the door mirror are thereby reduced. Thus, it is possible to ensure the desired performance of distance measurement in a short-distance range is ensured, and to provide unerring alarm information to the driver.

Further, a cushioning member is provided between the transmitting and receiving antennas and the door mirror to prevent the antennas inside the door mirror from contacting and breaking the door mirror.

What is claimed is:

1. A vehicle surroundings monitoring device which monitors surroundings around a vehicle, said device comprising:
   a transmitting antenna mounted in a door mirror assembly of the vehicle, said transmitting antenna for radiating transmitted waves through a mirror surface of a door mirror in the door mirror assembly;
   a receiving antenna mounted in the door mirror assembly, said receiving antenna for receiving, through the mirror surface of the door mirror, reflected waves from an object existing near the vehicle; and
   a stray electric wave limiting member for reducing electric wave components straying from said transmitting antenna into said receiving antenna.

2. A vehicle surroundings monitoring device according to claim 1, wherein said stray electric wave limiting member comprises an electric wave absorbing member provided between opening surfaces of the door mirror corresponding respectively to said transmitting antenna and said receiving antenna.

3. A vehicle surroundings monitoring device according to claim 1, wherein said stray electric wave limiting member comprises a metal plate provided between said transmitting antenna and said receiving antenna.

4. A vehicle surroundings monitoring device according to claim 1, wherein said stray electric wave limiting member comprises an electric wave absorbing member provided between said transmitting and receiving antennas and the door mirror except in front of the opening surfaces of the door mirror corresponding to said transmitting and receiving antennas.

5. A vehicle surroundings monitoring device according to claim 1, wherein said stray electric wave limiting member comprises a matching layer provided between said transmitting and receiving antennas and the door mirror.

6. A vehicle surroundings monitoring device which monitors surroundings around a vehicle, said device comprising:
   a transmitting antenna mounted in a door mirror assembly of the vehicle, said transmitting antenna for radiating transmitted waves through a mirror surface of a door mirror in the door mirror assembly;
   a receiving antenna mounted in the door mirror assembly, said receiving antenna for receiving, through the mirror surface of the door mirror, reflected waves from an object existing near the vehicle; and
   a cushioning member provided between said transmitting and receiving antennas and the door mirror.

\* \* \* \* \*